United States Patent

[11] 3,589,701

[72] Inventor David William Gee
 Warwickshire, England
[21] Appl. No. 766,730
[22] Filed Oct. 11, 1968
[45] Patented June 29, 1971
[73] Assignee Girling Limited
 Tyseley, Birmingham, England
[32] Priority Oct. 24, 1967
[33] Great Britain
[31] 48,187/67

[54] VEHICLE SUSPENSIONS
 4 Claims, 3 Drawing Figs.
[52] U.S. Cl..................................... 267/64,
 280/96.2
[51] Int. Cl..................................... B60g 3/06,
 B60g 11/58, B60g 15/06
[50] Field of Search........................... 280/96.2,
 124; 267/64

[56] References Cited
UNITED STATES PATENTS
2,624,592 1/1953 MacPherson............... 280/96.2
2,660,449 11/1953 MacPherson............... 280/96.2
3,346,272 10/1967 Smith........................ 280/96.2

Primary Examiner—A. Harry Levy
Attorney—Scrivener, Parker, Scrivener and Clarke

ABSTRACT: In a suspension unit for a vehicle wheel incorporating a helical compression spring and a single tube hydraulic damper containing a gas spring adapted to support part of the load on the wheel the gas spring is formed by a volume of air or other gas under pressure which is not confined to any part of the damper cylinder but is allowed to rise to the upper end of the cylinder where the piston rod of the damper passes through an assembly including an oil seal and a reservoir for oil in contact with the seal.

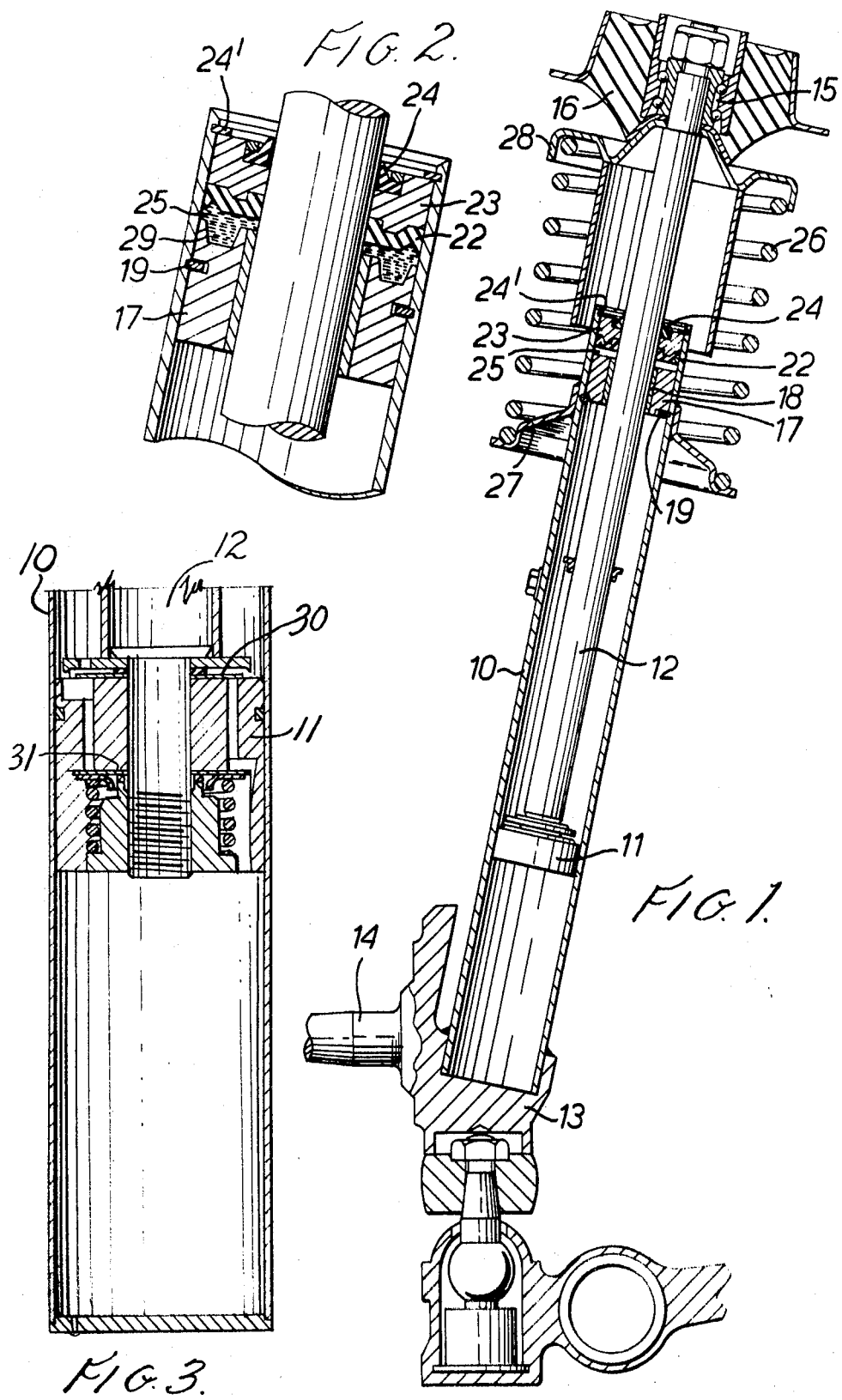

VEHICLE SUSPENSIONS

This invention relates to improvements in suspension units for vehicle wheels, the suspension unit being of the kind in which a stub axle is carried by a substantially vertical telescopic strut of which the lower end is articulated by linkage to the vehicle chassis or frame and the upper end is supported in an anchorage allowing a limited degree of angular movement, the unit including a helical compression spring.

In one known form of suspension unit of that kind the telescopic strut comprises a single tube hydraulic damper of which the cylinder carries a stub axle for the wheel. The cylinder incorporates an air or gas spring adapted to support a part of the load on the wheel and comprising a volume of air or gas under pressure which is located within the cylinder and is confined between the closed lower end of the cylinder and a separator piston slidably mounted in the cylinder or a rolling diaphragm of which the periphery is secured to the cylinder wall.

According to the present invention, in a suspension unit of the kind set forth the volume of air or other gas which forms the gas spring is not confined but is allowed to rise to the upper end of the damper cylinder above the oil, and the piston rod is carried through an assembly at the upper end of the cylinder incorporating a seal and a reservoir for oil in contact with the seal.

This oil lubricates the seal and prevents it from becoming dry and warping or cracking as might happen if the vehicle is out of action for prolonged periods.

One form of suspension unit embodying our invention is illustrated by way of example in the accompanying drawings in which:

FIG. 1 is a longitudinal section of the unit; and

FIG. 2 is a fragmentary section of a modified form of bearing and seal for the piston-rod of the damper.

FIG. 3 is a section of the piston of the damper, the section being taken in a plane containing the axis of the piston and piston rod.

In the unit shown in the drawing, the damper comprises a cylinder 10 which is partially filled with oil and in which works a piston 11 carried by a piston rod 12 extending through a bearing and seal at the upper end of the cylinder as described in more detail below. Passages through the piston 11 are controlled in the usual way by valves 30, 31 allowing flow of oil through the piston in both directions against resistances determined by the loading of the valve or valves.

The lower end of the cylinder is secured into a socket in a fitting 13 which carries a stub axle 14 and is articulated to the vehicle frame for substantially vertical movement relative to the frame.

The upper end of the piston rod is rotatably mounted in a bearing 15 in a rubber or other flexible mounting 16 on the frame, the mounting allowing a limited degree of angular movement.

Adjacent to the upper end of the cylinder the piston rod 12 extends upwardly through a bearing sleeve 17 fixed in the cylinder. The bore of the sleeve may be fitted with a liner 18 of polytetrafluoroethylene to reduce friction, or the surface of the bore may be impregnated with a material having a low coefficient of friction.

The bearing sleeve is located axially in the cylinder by a Circlip 19 received partly in an annular groove in the cylinder wall and partly in a registering annular recess in the sleeve. In another arrangement (not shown) a part of the recess in the sleeve is enlarged to receive the ends of the Circlip and to allow the ends to be gripped by a pair of pliers or other tool for contracting the Circlip and disengaging it from the groove in the cylinder wall when it is required to withdraw the sleeve from the cylinder.

Above the bearing sleeve 17 there is an oil seal 22 and above that there is an annular support 23 for the seal.

A scraper ring 24 is mounted in an annular recess in the upper surface of the seal support 23 which is retained in position by a spring ring 24' engaged in an annular groove in the cylinder wall.

There is an annular space 25 around the piston rod between the underside of the oil seal 22 and the upper end of the bearing sleeve 17 which forms a reservoir for oil.

The cylinder is partially filled with oil and there is forced into it air or other gas at a pressure which will usually be of the order of 150 pounds per square inch.

The air or gas is not confined or kept separate from the oil and rises to the upper end of the damper cylinder above the oil.

The compressed air or gas in the damper cylinder acts as a spring which takes part of the load on the suspension, the remainder being taken by a helical compression spring 26 which fits over the upper part of the cylinder between abutments 27 and 28 on the cylinder and the piston rod respectively.

When the vehicle is in use sufficient oil is carried up on the surface of the piston rod past the bearing sleeve 17 to keep the space 25 full of oil. This oil lubricates the seal and keeps it flexible.

In the modification shown in FIG. 2 an annular groove 29 is formed in the upper end of the bearing sleeve to increase the effective capacity of the oil reserve.

I claim:

1. A suspension unit for a vehicle wheel comprising a sole, fluidtight cylinder, a stub axle for mounting said wheel attached to said cylinder, a piston in said cylinder including a piston rod adapted to be attached at its upper end to the chassis of a vehicle, a helical compression spring coaxial with said cylinder and engaging spring-retaining means carried by the piston rod and by the cylinder respectively, hydraulic fluid partly filling said cylinder, a free volume of gaseous fluid under pressure in said cylinder and serving as a fluid spring cooperating with said compression spring, said volume being unrestricted within said cylinder so as to be free to rise above said hydraulic fluid, a guide assembly at the upper end of the cylinder and slidably receiving the piston rod, a closed reservoir in said guide assembly and in open communication with said piston rod to receive and trap oil carried on said piston rod to said reservoir when said rod is reciprocated relative to said reservoir as the result of vehicle use, an oil seal on the upper side of said reservoir and sealingly surrounding said rod, the oil in said reservoir contacting said seal to lubricate the same and prevent it from drying out and cracking during periods of vehicle nonuse.

2. A suspension unit as in claim 1 wherein said guide assembly includes a bearing sleeve below said oil seal, said reservoir being defined by a space around the piston rod between the bearing sleeve and the oil seal.

3. A suspension unit as in claim 2 wherein part of said oil reservoir is formed by an annular groove in the upper end of the bearing sleeve.

4. A suspension unit as in claim 1 including a scraper ring engaging said rod and carried by said guide assembly on the side thereof opposite the pressure space in said cylinder.